US011941415B2

(12) United States Patent
Won et al.

(10) Patent No.: US 11,941,415 B2
(45) Date of Patent: Mar. 26, 2024

(54) AUDIO PLAYBACK DEVICE AND METHOD FOR CONTROLLING OPERATION THEREOF

(71) Applicant: SAMSUNG ELECTRONICS CO., LTD., Suwon-si (KR)

(72) Inventors: Mi-youn Won, Seoul (KR); Jung-geun Kim, Suwon-si (KR); Ji-hyae Kim, Seoul (KR); Won-hee Lee, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/699,863

(22) Filed: Mar. 21, 2022

(65) Prior Publication Data
US 2022/0206827 A1 Jun. 30, 2022

Related U.S. Application Data

(63) Continuation of application No. 16/076,842, filed as application No. PCT/KR2016/014120 on Dec. 2, 2016, now Pat. No. 11,307,874.

(30) Foreign Application Priority Data

Feb. 17, 2016 (KR) ........................ 10-2016-0018555

(51) Int. Cl.
G06F 9/451 (2018.01)
G06F 3/16 (2006.01)
(Continued)

(52) U.S. Cl.
CPC .............. *G06F 9/451* (2018.02); *G06F 3/165* (2013.01); *H04R 3/12* (2013.01); *G11B 27/34* (2013.01);
(Continued)

(58) Field of Classification Search
None
See application file for complete search history.

(56) References Cited

U.S. PATENT DOCUMENTS 8,749,485 B2 6/2014 Tan et al.
2003/0048912 A1 3/2003 Reich
(Continued)

FOREIGN PATENT DOCUMENTS

CN 201537390 U 8/2010
JP 2015-53550 3/2015
(Continued)

OTHER PUBLICATIONS

Korean Office Action for Korean Patent Application No. 10-2016-0018555 dated Aug. 22, 2021.
(Continued)

*Primary Examiner* — Kenny H Truong
(74) *Attorney, Agent, or Firm* — STAAS & HALSEY LLP

(57) ABSTRACT

Provided are an audio reproduction device and a method of controlling an operation thereof, which involve a user interface that allows a user to more effectively control various functions. The audio reproduction device includes a processor configured to obtain function information of the audio reproduction device corresponding to a user input received using mapping information for mapping between a user input received based on at least one of at least one wheel region rotatable clockwise or counterclockwise and at least one touch region and function information of the audio reproduction device, and to control the audio reproduction device according to the obtained function information of the audio reproduction device.

20 Claims, 10 Drawing Sheets

(51) Int. Cl.
    *G11B 27/34*    (2006.01)
    *H04R 1/02*    (2006.01)
    *H04R 1/26*    (2006.01)
    *H04R 3/12*    (2006.01)

(52) U.S. Cl.
    CPC .............. *H04R 1/028* (2013.01); *H04R 1/26* (2013.01); *H04R 2201/028* (2013.01)

(56) References Cited

U.S. PATENT DOCUMENTS

| | | | |
|---|---|---|---|
| 2007/0217619 | A1 | 9/2007 | Hall |
| 2008/0291673 | A1* | 11/2008 | Chen .................. F21S 6/003 362/231 |
| 2010/0265414 | A1 | 10/2010 | Nieuwlands |
| 2011/0029867 | A1* | 2/2011 | Park .................. G10H 1/0091 715/702 |
| 2013/0057500 | A1 | 3/2013 | Kulczycki |
| 2016/0073200 | A1 | 3/2016 | Yoo |
| 2016/0127814 | A1 | 5/2016 | Lin |
| 2016/0309246 | A1 | 10/2016 | O'Keefe |
| 2019/0012073 | A1 | 1/2019 | Hwang |

FOREIGN PATENT DOCUMENTS

| | | |
|---|---|---|
| KR | 10-0797390 | 1/2008 |
| KR | 20-2010-0007005 | 7/2010 |
| KR | 10-2011-0090181 | 8/2011 |
| KR | 10-2013-0031839 | 3/2013 |
| KR | 10-2013-0120668 | 11/2013 |

OTHER PUBLICATIONS

International Search Report, PCT/ISA 210, dated Mar. 8, 2017, in corresponding International Patent Application No. PCT/KR2016/014120.
International Written Opinion, PCT/ISA/237, dated Mar. 8, 2017, in corresponding International Patent Application No. PCT/KR2016/014120.
U.S. Non-Final Office Action for U.S. Appl. No. 16/076,842 dated Jun. 27, 2019.
U.S. Non-Final Office Action for U.S. Appl. No. 16/076,842 dated Dec. 5, 2019.
U.S. Final Office Action for U.S. Appl. No. 16/076,842 dated Apr. 29, 2020.
U.S. Non-Final Office Action for U.S. Appl. No. 16/076,842 dated Oct. 9, 2020.
U.S. Non-Final Office Action for U.S. Appl. No. 16/076,842 dated Mar. 30, 2021.
U.S. Non-Final Office Action for U.S. Appl. No. 16/076,842 dated Jun. 10, 2021.
U.S. Notice of Allowance for U.S. Appl. No. 16/076,842 dated Dec. 21, 2021.
Brazilian Office Action dated Jul. 14, 2020 in Brazilian Patent Application No. BR112018014130-5.
U.S. Appl. No. 16/076,842, filed Aug. 9, 2018, Mi-youn Won et al., Samsung Electronics Co., Ltd.
Office Action dated Dec. 22, 2022 in Korean Patent Application No. 10-2022-0049543 (6 pages; 5 pages English translation).

* cited by examiner

FIG. 3

| REGION INFORMATION | USER INPUT | PLAYBACK | SEARCH | INSTRUMENT | DJ EFFECT | LIGHTING EFFECT |
|---|---|---|---|---|---|---|
| WHEEL REGION | TURN L/R | UP/DOWN VOLUME | BROWSING | CHANGE MUSICAL INSTRUMENT CATEGORY, CHANGE MUSICAL INSTRUMENT | CHANGE DJ EFFECT CATEGORY (SIMULTANEOUSLY WITH TOUCH) SCRATCH EFFECT | CHANGE LIGHTING CATEGORY |
| TOUCH REGION | TAP | PLAY/PAUSE | SELECT/ENTER | PLAY MUSICAL INSTRUMENT | PLAY EFFECT ON/OFF | PROVIDE ADDITIONAL LIGHTING EFFECT |
| | SWIPE L/R | Previous/ Next Music | (LEFT) BACK (RIGHT) N/A | CHANGE DETAILED MUSICAL INSTRUMENT (CASE OF LATIN KIT: DRUM > AGOGO > BONGO) | CHANGE PANNING NUMERICAL VALUE (LEFT=MIN, RIGHT=MAX) | GRADATION LIGHTING EFFECT (RIGHT AND LEFT) |
| | SWIPE U/D | CHANGE GENRE OR FOLDER | CHANGE FOLDER OR PARENT CATEGORY | CHANGE VOLUME NUMERICAL VALUE OF EACH MUSICAL INSTRUMENT | CHANGE EFFECT NUMERICAL VALUE | GRADATION LIGHTING EFFECT (UP AND DOWN) |
| | LONG TAP | STOP | N/A | PLAY MUSICAL INSTRUMENT, LONG VERSION (AUTO PLAY) | N/A | AUTO MIX LIGHTING MODE |
| | EDGE CIRCLING L/R | SHUFFLE PLAY | N/A | AUTOMATIC PLAY OF MUSICAL INSTRUMENT | N/A | GRADATION LIGHTING EFFECT (TORNADO) |

FIG. 5

[AUDIO PLAY MODE]

| USER INPUT | TAP | SWIPE LEFT/RIGHT | SWIPE UP/DOWN | TURN WHEEL | CIRCLE |
|---|---|---|---|---|---|
| FUNCTION INFORMATION OF AUDIO REPRODUCTION DEVICE | PLAY/PAUSE | PREV/NEXT SONG | PREV/NEXT FOLDER /CATEGORY | VOLUME UP/DOWN | SHUFFLE PLAY |
| LIGHT EMITTED FROM AUDIO REPRODUCTION DEVICE | ▷ ❘❘❘ | ◁❘ ❘▷ | FOLDER/CATEGORY NAME | VOLUME STATUS E.G: 35 | ✗ |

FIG. 6

[SEARCH MODE]

| USER INPUT | TURN WHEEL BIG | TURN WHEEL | TAP | TURN WHEEL | TAP |
|---|---|---|---|---|---|
| FUNCTION INFORMATION OF AUDIO REPRODUCTION DEVICE | CHANGE TO SEARCH MODE | BROWSING.. | SELECT A FOLDER/CATEGORY | SELECT A FOLDER/CATEGORY | PLAY SELECTED SONG |
| LIGHT EMITTED FROM AUDIO REPRODUCTION DEVICE | SEARCH | HIGHLIGHTED LIST | FOLDER/CATEGORY NAME | FOLDER/CATEGORY NAME | △ |

FIG. 7

[INSTRUMENT MODE]

| USER INPUT | TURN WHEEL BIG TWICE | TURN WHEEL | TAP | SWIPE LEFT/RIGHT | SWIPE UP/DOWN | CIRCLE |
|---|---|---|---|---|---|---|
| FUNCTION INFORMATION OF AUDIO REPRODUCTION DEVICE | CHANGE TO SEARCH MODE | CHANGE INSTRUMENT KIT | PLAY INSTRUMENT | CHANGE INSTRUMENT | INST. VOLUME UP/DOWN | AUTO INST. PLAY |
| LIGHT EMITTED FROM AUDIO REPRODUCTION DEVICE | 'INSTRUMENT' | KIT NAME | INSTRUMENT ICON | INSTRUMENT ICON | INSTRUMENT ICON + VOLUME STATUS | 'AUTO PLAY' |

FIG. 8

[DJ EFFECT MODE]

| USER INPUT | TURN WHEEL BIG THREE TIMES | TURN WHEEL | TAP | SWIPE LEFT/RIGHT | SWIPE UP/DOWN | TAP+WHEEL |
|---|---|---|---|---|---|---|
| FUNCTION INFORMATION OF AUDIO REPRODUCTION DEVICE | CHANGE TO DJ EFFECT MODE | CHANGE DJ EFFECT | PLAY/PAUSE DJ EFFECT | PANNING +/− | EFFECT VALUE UP/DOWN | SCRATCH EFFECT |
| LIGHT EMITTED FROM AUDIO REPRODUCTION DEVICE | "DJ EFFECT" | EFFECT NAME | ON/OFF STATUS | PANNING STATUS | EFFECT VALUE STATUS | |

FIG. 9

AUDIO PLAYBACK DEVICE AND METHOD FOR CONTROLLING OPERATION THEREOF

CROSS-REFERENCE TO RELATED APPLICATION(S)

This application is a Continuation Application of U.S. patent application Ser. No. 16/076,842, filed on Aug. 9, 2018, which is a U.S. National Stage Application, which claims the benefit under 35 U.S.C. § 371 of International Patent Application No. PCT/KR2016/014120 filed on Dec. 2, 2016, which claims the foreign priority benefit under 35 U.S.C. § 119 of Korean Patent Application No. 10-2016-0018555, filed Feb. 17, 2016, the contents of each are incorporated herein by reference.

TECHNICAL FIELD

The present disclosure relates to an audio system, and more particularly, to an audio reproduction device and a method of controlling an operation thereof, which may reflect a user's taste when an audio signal is reproduced.

BACKGROUND ART

Recent audio reproduction devices provide various functions such as a sound effect function and/or a lighting effect function in order to reflect a user's taste when reproducing an audio signal.

DESCRIPTION OF EMBODIMENTS

Technical Problem

However, as functions that can be provided by the audio reproduction device become more varied, a user interface of the audio reproduction device may become complicated. Accordingly, there is a demand for a user interface that allows a user to more effectively control various functions provided by the audio reproduction device.

According to an aspect of the present disclosure, embodiments of the present disclosure provide an audio reproduction device and a method of controlling an operation thereof, which involve a user interface that allows a user to more effectively control various functions.

Advantageous Effects of Disclosure

A user may more effectively control various functions of an audio reproduction device.

BRIEF DESCRIPTION OF DRAWINGS

FIG. 3 is an example of mapping information stored in an audio reproduction device according to an embodiment.

FIG. 5 is a view for explaining, when an audio reproduction device according to an embodiment is in an audio reproduction mode, function information of the audio reproduction device according to a user input and light emitted from the audio reproduction device.

FIG. 6 is a view for explaining, when an audio reproduction device according to an embodiment is in a search mode, function information of the audio reproduction device according to a user input and light emitted from the audio reproduction device.

FIG. 7 is a view for explaining, when an audio reproduction device according to an embodiment is in a musical instrument mode, function information of the audio reproduction device according to a user input and light emitted from the audio reproduction device.

FIG. 8 is a view for explaining, when an audio reproduction device according to an embodiment is in a disc jockey (DJ) effect mode, function information of the audio reproduction device according to a user input and light emitted from the audio reproduction device.

FIG. 9 is a view for explaining, when an audio reproduction device according to an embodiment is in a light effect mode, function information of the audio reproduction device according to a user input and light emitted from the audio reproduction device.

BEST MODE

Figure 1:
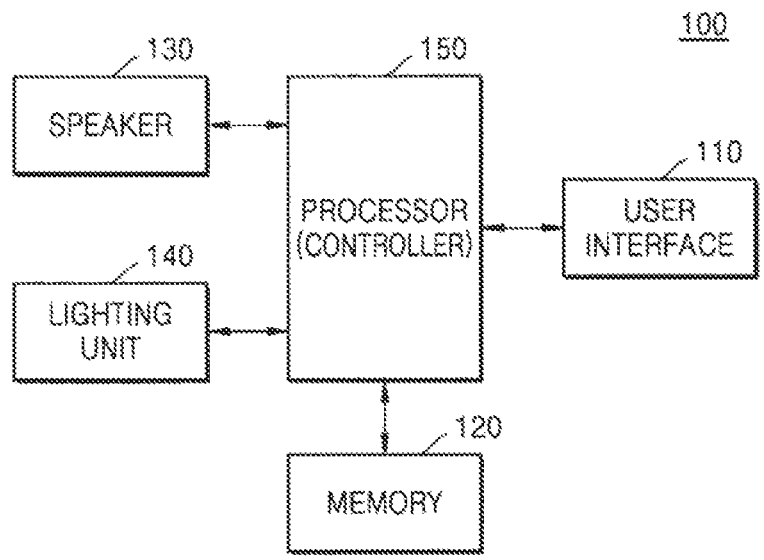
FIG. 1 is a functional block diagram of an audio reproduction device according to an embodiment.

As a technical means for achieving the above-mentioned technical problem, the first aspect of the present disclosure may provide an audio reproduction device including a user interface that can be effectively controlled by a user. The audio reproduction device may include a user interface including at least one wheel region rotatable clockwise or counterclockwise and at least one touch region; a memory storing mapping information for mapping between a user input received based on at least one of the at least one wheel region and the at least one touch region and function information of the audio reproduction device; a processor for obtaining the function information of the audio reproduction device based on the mapping information as the user input is received and controlling the audio reproduction device according to the obtained function information of the audio reproduction device; and a speaker controlled by the processor to generate sound.

Furthermore, the audio reproduction device may further include a lighting unit capable of adjusting color and/or brightness, and the processor may control the lighting unit according to function information of the lighting unit included in the obtained function information of the audio reproduction device.

Furthermore, the lighting unit may include: a first light that fills a unit surface of the speaker; and a second light arranged on a contour portion of the unit surface of the speaker.

Furthermore, the audio reproduction device may further include a lighting unit that is controlled by the processor to display the obtained function information of the audio reproduction device by emitting light to the outside of the audio reproduction device.

Furthermore, the audio reproduction device may further include a display which is controlled by the processor to display the obtained function information of the audio reproduction device.

In addition, the touch region may be mounted inside the wheel region.

As a technical means for achieving the above-mentioned technical problem, the second aspect of the present disclosure may provide a method of controlling an operation of an audio reproduction device according to a user input received through a user interface that can be effectively controlled by a user. The method of controlling an operation of the audio reproduction device may include receiving a user input through a user interface included in the audio reproduction device, wherein the user interface includes at least one wheel region rotatable clockwise or counterclockwise and at least one touch region; obtaining the function information of the audio reproduction device corresponding to the received user input from mapping information stored in the audio reproduction device, wherein the mapping information is mapping information for mapping between the user input and the function information of the audio reproduction device; and controlling the audio reproduction device according to the obtained function information of the audio reproduction device.

Furthermore, the controlling of the audio reproduction device may include controlling at least one of at least one speaker and at least one lighting unit included in the audio reproduction device.

Furthermore, the function information of the audio reproduction device may include at least one of sound effect function information, light effect function information, and audio reproduction function information.

Furthermore, the method may further include displaying the obtained function information of the audio reproduction device by emitting light to the outside of the audio reproduction device using a lighting effect function.

Furthermore, the method may further include displaying the obtained function information of the audio reproduction device.

As a technical means for achieving the above-mentioned technical problem, the third aspect of the present disclosure may provide a computer-readable recording medium having recorded thereon a program which, when executed by a computer, performs the method of the second aspect.

MODE OF DISCLOSURE

Reference will now be made in detail to embodiments, examples of which are illustrated in the accompanying drawings. In this regard, the present disclosure may have different forms and should not be construed as being limited to the descriptions set forth herein. In addition, descriptions of well-known functions and constructions will be omitted for clarity and conciseness, and similar reference numerals are assigned to similar elements throughout the specification.

Throughout the specification, it will be understood that when a unit is referred to as being "connected" to another element, it may be "directly connected" to the other element or "electrically connected" to the other element in a state in which intervening elements are present. In addition, it will be understood that when a unit is referred to as "comprising" another element, it may not exclude the other element but may further include the other element unless specifically oppositely indicated.

Hereinafter, the present disclosure will be described in detail with reference to the accompanying drawings.

FIG. 1 is a functional block diagram of an audio reproduction device 100 according to an embodiment. In the present disclosure, the audio reproduction device 100 may be referred to as an audio player. Referring to FIG. 1, the audio reproduction device 100 includes a user interface 110, a memory 120, a speaker 130, a lighting unit 140, and a processor 150.

The user interface 110 may receive a user input. The user interface 110 may include at least one wheel region and at least one touch region.

Figure 2:
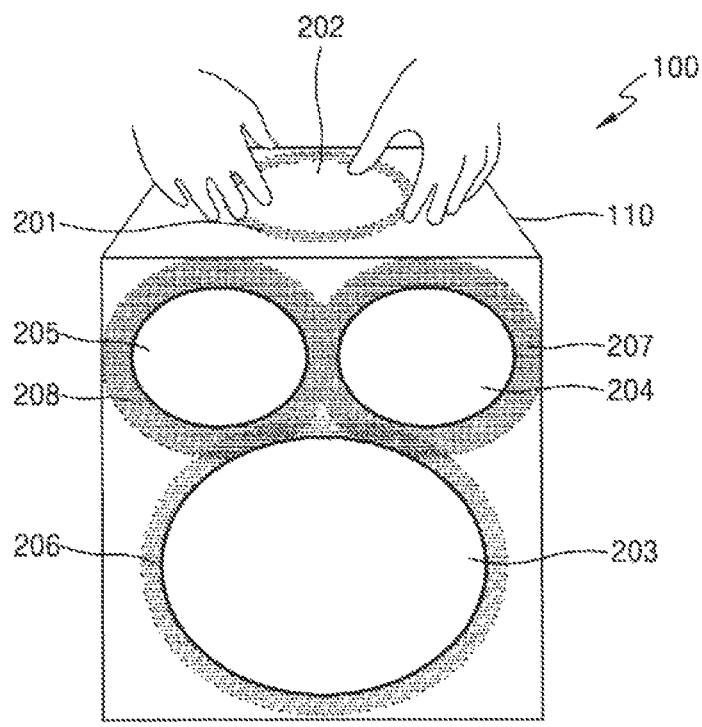
FIG. 2 is an example of an external view of an audio reproduction device according to an embodiment.

FIG. 2 is an example of an external view of the audio reproduction device 100 according to an embodiment. Referring to FIG. 2, the user interface 110 includes one wheel region 201 and one touch region 202.

The wheel region 201 is rotatable 360 degrees clockwise or counterclockwise. The wheel region 201 may include at least one of plastic, metal, aluminum, rubber, and composite materials. However, the material constituting the wheel region 201 is not limited to the above-mentioned materials.

The touch region 202 may receive a touch-based user input. The touch-based user input may include, for example, tap, swipe, long tap, right or left circle, but is not limited thereto. For example, the touch-based user input may be double tap, press, pan, drag, flick, pinch out, pinch in, rotate, multiple finger tap, multiple finger double tap, multiple finger swipe, five-finger pinch out, five-finger pinch in, press and tap, and/or press and drag, but is not limited thereto.

The touch region 202 may include a touch pad based on a decompression type, a capacitive type, an infrared type, or an ultrasonic type, but the type constituting the touch region 202 in the present disclosure is not limited thereto.

The touch region 202 may include a touch panel including a display. When the touch region 202 includes a touch panel, the audio reproduction device 100 may provide feedback information according to a user input based on at least one of the wheel region 201 and the touch region 202 through the touch region 202.

The feedback information may include, but is not limited to, function information of the audio reproduction device 100 obtained according to a user input, or/and information indicating reception of the user input.

For example, when a user input received according to rotation of the wheel region 201 is an operation mode change of the audio reproduction device 100, the feedback information may be information of the changed operation mode of the audio reproduction device 100. The feedback information may be in the form of, but is not limited to, a text, an image, or/and a symbol. The feedback information may be provided through the lighting unit 140. For example, the feedback information may be provided using a function of emitting light from the audio reproduction device 100 to the outside among functions included in the lighting unit 140.

The touch region 202 may be mounted inside the wheel region 201. The touch region 202 may be mounted to rotate together with the wheel region 201 in combination with the wheel region 201 but may be mounted independently of the wheel region 201 so as not to be influenced by the rotation of the wheel region 201.

The user interface 110 may include a plurality of wheel regions 201 and a plurality of touch regions 202, as shown in FIG. 2. When the user interface 110 includes the plurality of wheel regions 201 and the plurality of touch regions 202, the audio reproduction device 100 may recognize a user input that combines a plurality of user inputs received together through each of the wheel regions and the touch regions included in the user interface 110.

For example, when user inputs are received through one wheel region included in the user interface 110 and a touch region mounted inside another wheel region included in the user interface 110, respectively, the audio reproduction device 100 may obtain function information of the audio reproduction device 100 corresponding to a user input that combines the plurality of received user inputs.

The user interface 110 may further include a display independent of the wheel region 201 and the touch region 202. The display according to the present disclosure may be, for example, but is not limited to, a vacuum fluorescent display (VFC).

The audio reproduction device 100 may display the function information of the audio reproduction device 100 obtained by receiving the user input based on at least one of the wheel region 201 and the touch region 202 through the display.

The function information of the audio reproduction device 100 may include at least one of sound effect function information, light effect function information, and audio reproduction function information.

The sound effect function information includes, for example, but is not limited to, musical instrument category information, a musical instrument name, volume information, play type information (e.g., repeated play, long sound source play, etc.), disc jockey (DJ) effect category information, DJ effect play on/off information, panning numerical information, and/or DJ effect numerical information, etc.

The lighting effect information may include, for example, but is not limited to, lighting category information, information about whether to play an additional lighting effect, and/or gradation lighting effect information (e.g., gradient direction information, gradation type information (e.g., tornado)).

The audio reproduction function information may include, for example, but is not limited to, reproduction mode information, play, stop, previous song information, next song information, genre or folder change information, stop, a play mode (e.g., shuffle play), browsing mode information, selection or enter information, and folder or parent category information.

The user interface 110 may include a button for setting an operation mode of the audio reproduction device 100. The number of buttons may be determined according to the number of operating modes of the audio reproduction device 100. For example, when the operation mode of the audio reproduction device 100 includes an audio reproduction mode, a search mode, a musical instrument mode, a DJ effect mode, and a lighting effect mode, the number of buttons for setting the operation mode included in the user interface 110 may be five.

When the user interface 110 includes a button capable of setting an operation mode, the user interface 110 may further include a lamp corresponding to the button so that a user may intuitively know an operation mode set in the audio reproduction device 100. The lamp described above may be configured to emit light as a corresponding operating mode is set.

The user interface 110 may further include a microphone. The audio reproduction device 100 may output a user audio signal received through the microphone through the speaker 130. When the user interface 110 includes the microphone, the user interface 110 may further include an on/off control button for a microphone function.

The memory 120 may store mapping information for mapping between user input received through the user interface 110 and the function information of the audio reproduction device 100. FIG. 3 is an example of the mapping information stored in the memory 120.

Referring to FIG. 3, the operation mode of the audio reproduction device 100 includes, but is not limited to, a music reproduction mode, a search mode, a musical instrument mode, a DJ effect mode, and a lighting effect mode.

Figure 4:
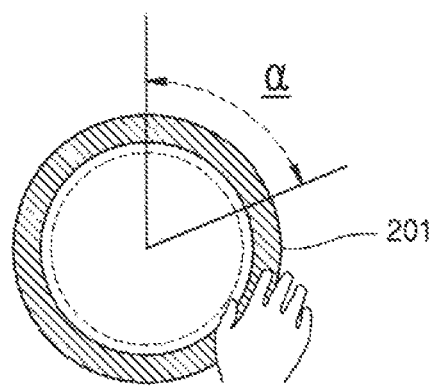
FIG. 4 is a view for explaining an example of changing an operation mode of an audio reproduction device by using a wheel region included in the audio reproduction device according to an embodiment.

The above-described operation mode may be changed according to a user input that rotates the wheel region 201 clockwise R or counterclockwise L by a predetermined angle or more. FIG. 4 is a view for changing the operation mode of the audio reproduction device 100 by turning the wheel region 201 according to an embodiment clockwise R (right) by an angle of a or more. Changing the operation mode of the audio reproduction device 100 in the present disclosure is not limited to that shown in FIG. 4. For example, the operation mode of the audio reproduction device 100 may be changed by turning the wheel region 201 counterclockwise direction L (left)) by an angle of β or more.

The audio reproduction device 100 may change the operation mode according to a preset order. When the operation mode of the audio reproduction device 100 is as shown in FIG. 3, the preset order may be, but is not limited to, an audio reproduction mode, a search mode, a musical instrument mode, a DJ effect mode, and a lighting mode. The preset order may be changed according to a user input.

The audio reproduction device 100 may change the operation mode according to information about the number of times of rotation of the wheel region 201 by a predetermined angle or more. For this, the audio reproduction device 100 may store mapping information for mapping between the information about the number of times of rotation of the wheel region 201 by a predetermined angle or more and operation mode information of the audio reproduction device 100 in the memory 120. The audio reproduction device 100 may obtain the operation mode information of the audio reproduction device 100 from the mapping information stored in the memory 120 by using the information about the number of times of rotation of the wheel region 201 by a predetermined angle or more.

For example, when the information about the number of times of rotation of the wheel region 201 by a predetermined angle or more is 1, the audio reproduction device 100 may obtain the audio reproduction mode from the mapping information stored in the memory 120 as the operation mode information of the audio reproduction device 100.

For example, when the information about the number of times of rotation of the wheel region 201 by a predetermined angle or more is 2, the audio reproduction device 100 may obtain the search mode from the mapping information stored in the memory 120 as the operation mode information of the audio reproduction device 100.

For example, when the information about the number of times of rotation of the wheel region 201 by a predetermined angle or more is 3, the audio reproduction device 100 may obtain the musical instrument mode from the mapping information stored in the memory 120 as the operation mode information of the audio reproduction device 100.

For example, when the information about the number of times of rotation of the wheel region 201 by a predetermined angle or more is 4, the audio reproduction device 100 may obtain the DJ effect mode from the mapping information stored in the memory 120 as the operation mode information of the audio reproduction device 100.

For example, when the information about the number of times of rotation of the wheel region 201 by a predetermined angle or more is 5, the audio reproduction device 100 may obtain the lighting effect mode from the mapping information stored in the memory 120 as the operation mode information of the audio reproduction device 100.

The audio reproduction device 100 may change the operation mode of the audio reproduction device 100 according to a preset operation mode sequence every time the wheel region 201 is rotated by a predetermined angle or more.

Referring to FIG. 3, when a user input by turning left or right the wheel region 201 is received when the operation mode of the audio reproduction device 100 is the audio reproduction mode, the audio reproduction device 100 may increase or decrease the volume of sound generated through the speaker 130.

Referring to FIG. 3, when a user input based on tapping the touch region 202 is received when the operation mode of the audio reproduction device 100 is the audio reproduction mode, the audio reproduction device 100 may reproduce or stop an audio signal.

When the user input based on tapping the touch region 202 is received when the audio reproduction device 100 is reproducing the audio signal, the audio reproduction device 100 may stop the reproduction of the audio signal. When the user input based on tapping the touch region 202 is received while the audio reproduction device 100 is pausing the reproduction of the audio signal, the audio reproduction device 100 may reproduce the audio signal.

Referring to FIG. 3, when a user input based on swiping right on the touch region 202 is received regardless of whether the audio signal is reproduced by the audio reproduction device 100, the audio reproduction device 100 may reproduce an audio signal of the previous music (or previously reproduced music) of the current music (or song, or audio).

Referring to FIG. 3, when a user input based on swiping left on the touch region 202 is received regardless of whether the audio signal is reproduced by the audio reproduction device 100, the audio reproduction device 100 may reproduce an audio signal of the next music (or music to play next) of the current music (or song, or audio).

Referring to FIG. 3, when the user input based on swiping up or down on the touch region 202 is received regardless of whether the audio signal is reproduced by the audio reproduction device 100, the audio reproduction device 100 may change a genre or a folder.

Referring to FIG. 3, when a user input by long tapping the touch region 202 is received while the audio reproduction device 100 is reproducing the audio signal, the audio reproduction device 100 may stop the reproduction of the audio signal.

Referring to FIG. 3, when a user input by edge circling right or left on the touch region 202 of the audio reproduction device 100 is received, the audio reproduction device 100 may perform shuffle play.

Referring to FIG. 3, when a user input based on turning the wheel region 201 right or left is received when the operation mode of the audio reproduction device 100 is the search mode, the audio reproduction device 100 may browse reproducible music.

Referring to FIG. 3, when the user input based on tapping the touch region 20 is received after the reproducible music is browsed by receiving the user input based on turning the wheel region 201 right or left when the operation mode of the audio reproduction device 100 is the search mode, the audio reproduction device 100 may select a currently browsed music.

Referring to FIG. 3, when the user input based on swiping left on the touch region 202 is received when the operation mode of the audio reproduction device 100 is the search mode, the audio reproduction device 100 may change the searched music to the previously searched music.

Referring to FIG. 3, when the user input based on swiping right on the touch region 202 is received when the operation mode of the audio reproduction device 100 is the search mode, there is no function to be performed by the audio reproduction device 100, but the present disclosure is not limited thereto.

Referring to FIG. 3, when a user input by swiping up or down the touch region 202 is received when the operation mode of the audio reproduction device 100 is the search mode, the audio reproduction device 100 may change a folder or a category.

Referring to FIG. 3, when a user input by long tapping or edge circling right or left on the touch region 202 is received when the operation mode of the audio reproduction device 100 is the search mode, there is no function to be performed by the audio reproduction device 100, but the present disclosure is not limited thereto.

Referring to FIG. 3, when the user input based on turning the wheel region 201 right or left is received when the operation mode of the audio reproduction device 100 is the musical instrument mode, the audio reproduction device 100 may change a musical instrument category or change the musical instrument.

Referring to FIG. 3, when a user input based on tapping the touch region 202 is received when the operation mode of the audio reproduction device 100 is the musical instrument mode, the audio reproduction device 100 may perform a musical instrument play function.

Referring to FIG. 3, when the user input based on the swiping left or right on the touch region 202 is received when the operation mode of the audio reproduction device 100 is the musical instrument mode, the audio reproduction device 100 may perform a detailed musical instrument changing function.

Referring to FIG. 3, when the user input based on the swiping up or down on the touch region 202 is received when the operation mode of the audio reproduction device 100 is the musical instrument mode, the audio reproduction device 100 may perform a function of changing a volume numerical value of each musical instrument.

Referring to FIG. 3, when a user input based on the long tapping the touch region 202 is received when the operation mode of the audio reproduction device 100 is the musical instrument mode, the audio reproduction device 100 may perform a long version (automatic play) of musical instrument playing.

Referring to FIG. 3, when a user input based on edge circling left or right the touch region 202 is received when the operation mode of the audio reproduction device 100 is the musical instrument mode, the audio reproduction device 100 may perform an automatic musical instrument play function.

Referring to FIG. 3, when the user input based on turning the wheel region 201 right or left is received when the operation mode of the audio reproduction device 100 is the DJ effect mode, the audio reproduction device 100 may change the DJ effect category.

Referring to FIG. 3, when the user input based on tapping the touch region 202 is received when the operation mode of the audio reproduction device 100 is the DJ effect mode, the audio reproduction device 100 may perform a DJ effect playing on or off function.

Referring to FIG. 3, when the user input based on the swiping left or right on the touch region 202 is received when the operation mode of the audio reproduction device 100 is the DJ effect mode, the audio reproduction device 100 may perform a panning numerical value changing function. For example, when the user input based on swiping left on the touch region 202 is received, the audio reproduction device 100 may change a minimum value of the panning numerical value. When the user input based on swiping right on the touch region 202 is received, the audio reproduction device 100 may change a maximum value of the panning numerical value.

Referring to FIG. 3, when the user input based on turning the wheel region 201 right or left is received when the operation mode of the audio reproduction device 100 is the lighting effect mode, the audio reproduction device 100 may change the lighting effect category.

Referring to FIG. 3, when the user input based on tapping the touch region 202 is received when the operation mode of the audio reproduction device 100 is the lighting effect mode, the audio reproduction device 100 may provide an additional lighting effect.

Referring to FIG. 3, when the user input based on swiping right or left the touch region 202 is received when the operation mode of the audio reproduction device 100 is the lighting effect mode, the audio reproduction device 100 may provide a gradation lighting effect. For example, when a user input based on swiping right is received, the audio reproduction device 100 may provide a gradation lighting effect in the right direction.

Referring to FIG. 3, when the user input based on swiping up or down the touch region 202 is received when the operation mode of the audio reproduction device 100 is the lighting effect mode, the audio reproduction device 100 may provide a gradation lighting effect in an upward direction or a downward direction.

Referring to FIG. 3, when the user input by long tapping the touch region 202 is received when the operation mode of the audio reproduction device 100 is the lighting effect mode, the audio reproduction device 100 may be in an automatic mix lighting mode.

Referring to FIG. 3, when the user input based on edge circling right or left on the touch region 202 is received when the operation mode of the audio reproduction device 100 is the lighting effect mode, the audio reproduction device 100 may provide a gradation lighting effect in the form of a tornado.

The memory 120 may store programs for processing and controlling the audio reproduction device 100. The program stored in the memory 120 may include an operating system (OS) program and various application programs. The various application programs may include, but are not limited to, applications (e.g., a DJ effect application, a lighting effect application, an audio reproduction application, or an audio reproduction application with a DJ effect and a lighting effect function) capable of controlling an operation of the audio reproduction device 100 based on mapping information for mapping between the function information of the audio reproduction device 100 and a user input received through the user interface 110.

The memory 120 may store information managed by an application program. For example, the memory 120 may store mapping information as shown in FIG. 3. The memory 120 may include preset rotation angle information about the wheel region 201 used when changing the operation mode of the audio reproduction device 100 and mapping information for mapping between the information about the number of times of rotation by a rotation angle or more and the operation mode information of the audio reproduction device 100.

The memory 120 may store information of an additional lighting effect and lighting information of the operation mode of the audio reproduction device 100. The information of the additional lighting effect refers to information that can control the lighting unit 140 so as to provide a lighting effect that emits light in an impromptu manner according to the user input received through the user interface 110.

For example, when the current operation mode of the audio reproduction device 100 is an audio reproduction mode, the illumination information of the operation mode of the audio reproduction device 100 refers to information capable of controlling the lighting unit 140 so that a symbol ▷ indicating the audio reproduction mode may be emitted and displayed.

The memory 120 may include, but is not limited to, at least one type of storage medium from among memory of a flash memory type, a hard disk type, a multimedia card micro type or a card type (for example, SD or XD memory), random access memory (RAM), static random access memory (static RAM), read-only memory (ROM), electrically erasable programmable read-only memory (EEPROM), programmable ROM (PROM), magnetic memory, a magnetic disk, or an optical disk.

The speaker 130 may be controlled by the processor 150 to generate sound. The speaker 130 may include, but is not limited to, a plurality of speakers 203, 204, and 205 as shown in FIG. 2 to generate a sound of a high-frequency band and a sound of a low-frequency band, respectively.

The lighting unit 140 may be controlled by the processor 150 to emit light. Color and/or brightness of the emitted light may be controlled by the processor 150. The lighting unit 140 may be composed of, but is not limited to, a smart light emitting diode (LED). The processor 150 may adjust the color and/or brightness of the light emitted from the lighting unit 140 according to the sound generated from the speaker 130.

The lighting unit 140 may include a light that fills a unit surface of the speaker 130, and a light that is arranged in a line form on a contour portion of the unit surface of the speaker 130. Lightings 206, 207, and 208 shown in FIG. 2 are lightings that are arranged in a line form on the contour portion of the unit surface of the speakers 203, 204, and 205.

The lighting unit 140 may include a light that is at the bottom of the audio reproduction device 100 and emits light corresponding to the function information of the audio reproduction device 100 to the outside of the audio reproduction device 100. The light that is at the bottom of the audio reproduction device 100 and emits light corresponding to the function information of the audio reproduction device 100 may emit light according to the lighting information of the above-described operation mode. An installation position of the light emitting light according to the lighting information of the operation mode of the audio reproduction device 100 is not limited thereto. For example, the lighting emitting light according to the lighting information of the operation mode of the audio reproduction device 100 may be on a side surface or an upper end of the audio reproduction device 100.

The processor 150 may be configured as a controller or hardware that controls the entire function of the audio reproduction device 100 according to a user input received through the user interface 110. The processor 150 may control the operation of the audio reproduction device 100 based on an operating system stored in the memory 120. The processor 150 may control the speaker 130 and the lighting unit 140 based on the operating system stored in the memory 120.

The processor 150 may obtain the function information of the audio reproduction device 100 corresponding to a user input received from the user interface 110 from the mapping information stored in the memory 120 and may control at least one of the speaker 130, the lighting unit 140, and the user interface 110 using the obtained function information of the audio reproduction device 100.

The processor 150 may control the operation of the audio reproduction device 100 based on the flowchart shown in FIG. 11 described later below.

FIG. 5 is a view for explaining, when the operation mode of the audio reproduction device 100 is an audio reproduction mode, function information of the audio reproduction device 100 according to a user input received based on at least one of the wheel region 201 and the touch region 202 and light emitted from the audio reproduction device 100 through the lighting unit 140.

FIG. 5 corresponds a function of the audio reproduction device 100 based on the user input received through the wheel region 201 and the touch region 202 when the audio reproduction device 100 described with reference to FIG. 3 is in an audio reproduction mode. Therefore, the function information of the audio reproduction device 100 shown in FIG. 5 may correspond to the function information of the audio reproduction device 100 described with reference to FIG. 3.

Referring to FIG. 5, light emitted through the lighting unit 140 represents the function information of the audio reproduction device 100 based on the user input. When the audio reproduction device 100 reproduces an audio signal according to the user input, the audio reproduction device 100 may emit light corresponding to the symbol ▷ indicating audio signal reproduction from the audio reproduction device 100 through the lighting unit 140.

When the audio reproduction device 100 pauses the reproduction of the audio signal according to the user input, the audio reproduction device 100 may emit light corresponding to a symbol ∥ indicating a pause of the audio signal reproduction to the outside of the audio reproduction device 100 through the lighting unit 140.

When the audio reproduction device 100 reproduces a previous music or a next music according to the user input, the audio reproduction device 100 may emit light corresponding to a symbol indicating the previous music or the next music from the audio reproduction device 100 as shown in FIG. 5 through the lighting unit 140.

When the audio reproduction device 100 changes a folder or a category according to the user input, the audio reproduction device 100 may emit light corresponding to a folder name or a category name from the audio reproduction device 100 through the lighting unit 140.

When the audio reproduction device 100 ups or downs the volume according to the user input, the audio reproduction device 100 may emit light corresponding to the current volume information from the audio reproduction device 100 through the lighting unit 140.

When the audio reproduction device 100 performs shuffle play according to the user input, the audio reproduction device 100 may emit light corresponding to a symbol indicating the shuffle play from the audio reproduction device 100 through the lighting unit 140.

FIG. 6 is a view for explaining, when the operation mode of the audio reproduction device 100 is a search mode, function information of the audio reproduction device 100 according to a user input received based on at least one of the wheel region 201 and the touch region 202 and light emitted through the lighting unit 140.

Referring to FIG. 6, when the operation mode of the audio reproduction device 100 is changed to the search mode as the wheel region 201 is turned mostly right as described with reference to FIG. 4 when the operation mode of the audio reproduction device 100 is the audio reproduction mode, the audio reproduction device 100 may emit light corresponding to information (Search) indicating the search mode from the audio reproduction device 100 through the lighting unit 140.

After the operation mode of the audio reproduction device 100 is changed to the search mode, when a user input based on turning the wheel region 201 right or left is received as described in FIG. 3, the audio reproduction device 100 may emit light corresponding to list information highlighting information to be browsed to the outside through the lighting unit 140.

As shown in FIG. 6, the light emitted from the audio reproduction device 100 according to a user input based on tapping the touch region 202 and a user input based on turning wheel (an operation for turning right or left the wheel region 201) may correspond to a folder name or a category name.

Referring to FIG. 6, when the function information of the audio reproduction device 100 is to reproduce a selected song, after a song to be reproduced is selected based on tapping the touch region 202, the touch region 202 is tapped again.

FIG. 7 is a view for explaining, when the operation mode of the audio reproduction device 100 is a musical instrument mode, function information of the audio reproduction device 100 according to a user input received based on at least one of the wheel region 201 and the touch region 202 and light emitted through the lighting unit 140.

Referring to FIG. 7, when the operation mode of the audio reproduction device 100 is an audio signal reproduction mode, the operation mode of the audio reproduction device 100 may be changed to the musical instrument mode by turning the wheel region 201 twice largely as described in FIG. 4.

After the operation mode of the audio reproduction device 100 is changed to the musical instrument mode, as described in FIG. 3, a function of the audio reproduction device 100 is set as shown in FIG. 7 as the user input based on the wheel region 201 and/or the touch region 202 is received, and the audio reproduction device 100 may emit light indicating a function set through the lighting unit 140 from the audio reproduction device 100.

FIG. 8 is a view for explaining, when the operation mode of the audio reproduction device 100 is the DJ effect mode, function information of the audio reproduction device 100 according to a user input received based on at least one of the wheel region 201 and the touch region 202 and light emitted through the lighting unit 140.

Referring to FIG. 8, when the operation mode of the audio reproduction device 100 is the audio signal reproduction mode, the operation mode of the audio reproduction device 100 may be changed to the DJ effect mode by turning the wheel region 201 three times largely as described in FIG. 4.

After the operation mode of the audio reproduction device 100 is changed to the DJ effect mode, as described in FIG. 3, the function of the audio reproduction device 100 is set as shown in FIG. 8 as the user input based on the wheel region 201 and/or the touch region 202 is received, and the audio reproduction device 100 may emit light indicating the function set through the lighting unit 140 from the audio reproduction device 100.

Figure 9:
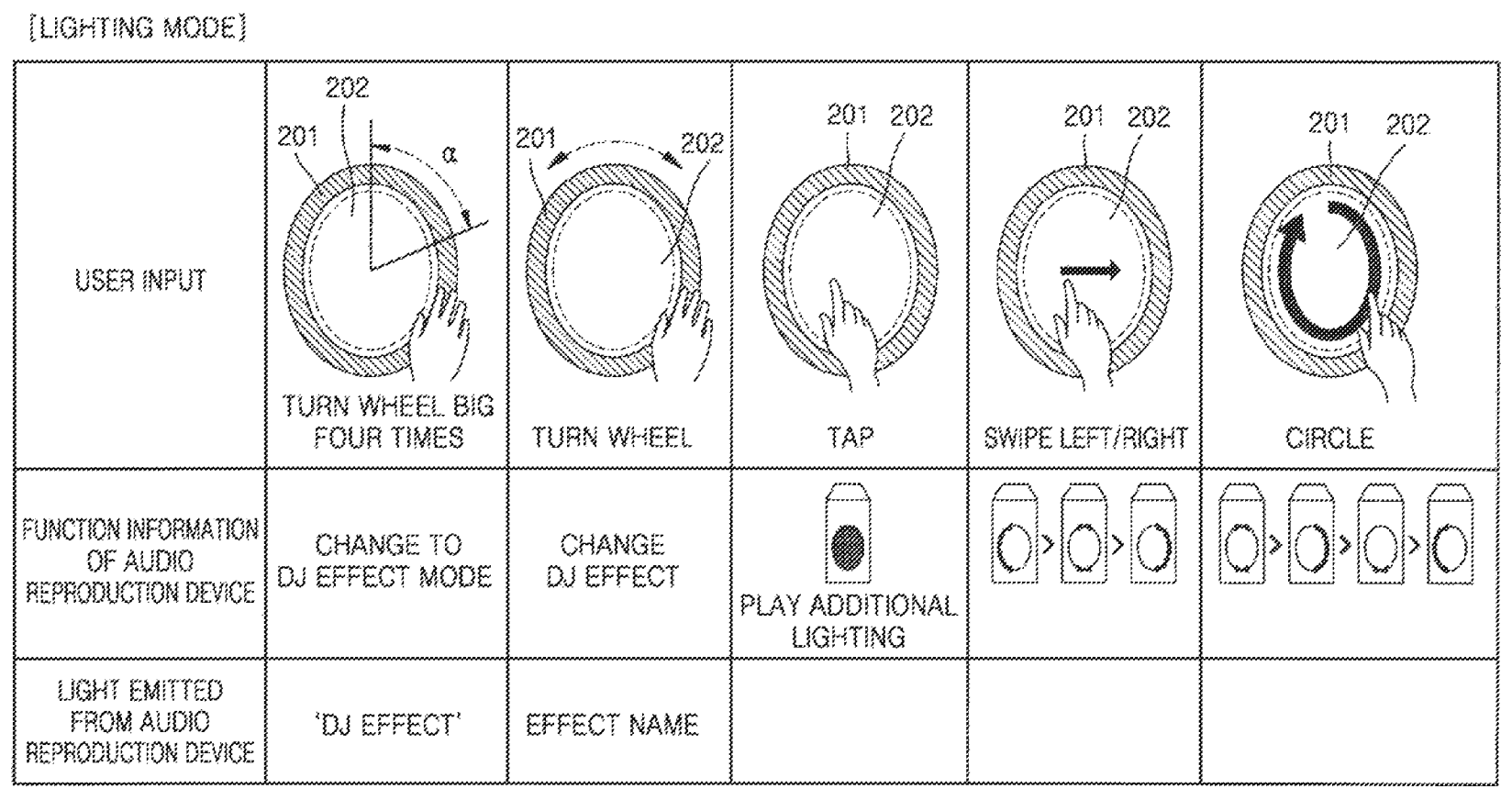

FIG. 9 is a view for explaining, when the operation mode of the audio reproduction device 100 is the light effect mode, function information of the audio reproduction device 100 according to a user input received based on at least one of the wheel region 201 and the touch region 202 and light emitted through the lighting unit 140.

Referring to FIG. 9, when the operation mode of the audio reproduction device 100 is the audio signal reproduction mode, the operation mode of the audio reproduction device 100 may be changed to the light effect mode by turning the wheel region 201 four times largely as described in FIG. 4.

After the operation mode of the audio reproduction device 100 is changed to the light effect mode, as described in FIG. 3, the function of the audio reproduction device 100 is set as shown in FIG. 9 as the user input based on the wheel region 201 and/or the touch region 202 is received, and the audio reproduction device 100 may emit light indicating the function set through the lighting unit 140 from the audio reproduction device 100.

Referring to FIG. 9, the audio reproduction device 100 may emit light through the lighting unit 140 according to a user input based on swiping left or right on the touch region 202. Referring to FIG. 9, the audio reproduction device 100 may determine a position of light emitted through the lighting unit 140 and an area to which the light is emitted according to a swiping speed and direction in the touch region 202.

Furthermore, referring to FIG. 9, the audio reproduction device 100 may emit light through the lighting unit 140 according to a user input based on edge circling left or light the touch region 202. Referring to FIG. 9, the audio reproduction device 100 may determine a position of light emitted through the lighting unit 140 and an area to which the light is emitted according to an edge circling speed and direction in the touch region 202.

Referring to FIGS. 5 to 9, the audio reproduction device 100 may include at least one projector in the lighting unit 140 to emit light from the audio reproduction device 100 through the lighting unit 140 as described above, but components included in the lighting unit 140 of the present disclosure are not limited to the above descriptions. For example, the lighting unit 140 may be composed of a smart LED.

In addition, the light emitted through the lighting unit 140 may represent at least one of a symbol type, a text type, and an image type. The memory 120 may store information of the type of light emitted through the lighting unit 140. The processor 150 may control the lighting unit 140 based on information about the type of light stored in the memory 120.

Figure 10:
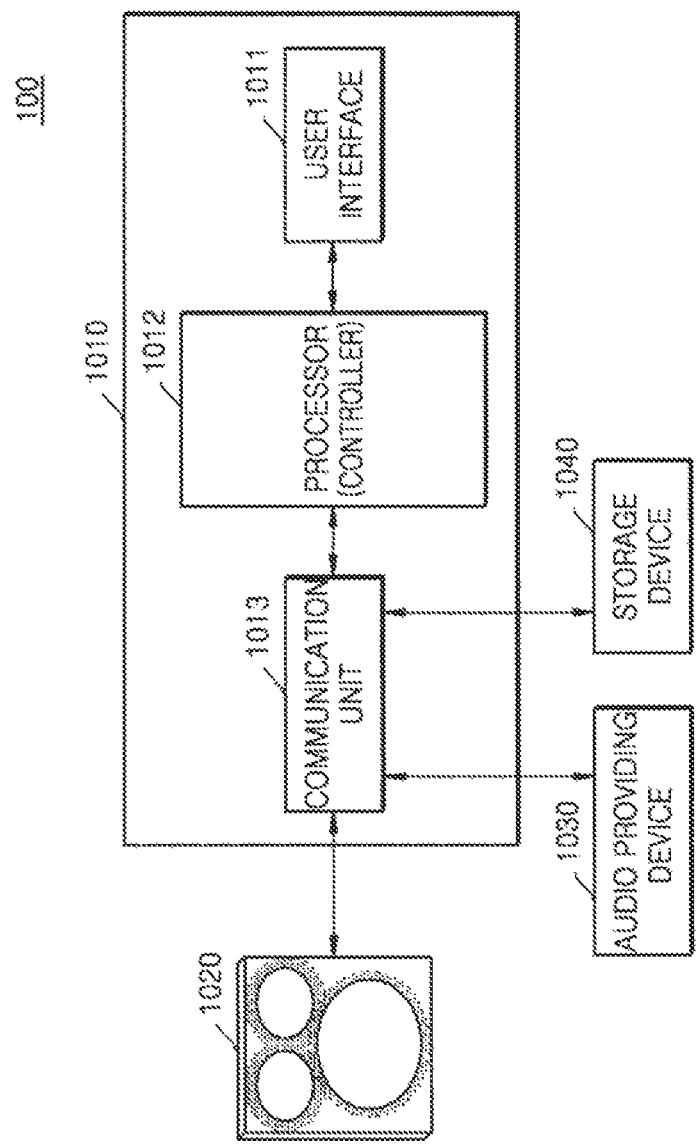
FIG. 10 is a functional block diagram of an audio reproduction device according to an embodiment.

Components of the audio reproduction device 100 according to the present disclosure, such as the components shown in FIG. 1, are not essential components. That is, the audio reproduction device 100 may include more or less components than those shown in FIG. 1. For example, the audio reproduction device 100 according to the present disclosure may be configured as shown in FIG. 10. FIG. 10 is a functional block diagram of an audio reproduction device 100 according to an embodiment.

Referring to FIG. 10, the audio reproduction device 100 may include an audio reproduction control device 1010, a speaker and lighting device 1020, an audio providing device 1030, and a storage device 1040.

The audio reproduction control device 1010 may include a user interface 1011, a processor 1012, and a communication unit 1013. The audio reproduction control device 1010 may control the speaker and the lighting device 1020 through the communication unit 1013 according to a user input received through the user interface 1011.

The audio reproduction control device 1010 may reproduce an audio signal received from the audio providing device 1030 through the communication unit 1013. The audio reproduction control device 1010 may read information stored in the storage device 1040 through the communication unit 1013 and write information to the storage device 1040.

The communication unit 1013 may transmit and receive information to and from at least one of the speaker and the lighting device 1020, the audio providing device 1030, and the storage device 1040 in a wireless or wired communication manner.

The communication unit 1013 may include one or more components for allowing communication between the audio reproduction control device 1010 and at least one external device. For example, the communication unit 1013 may include at least one of a short-range wireless communicator, a mobile communicator, and/or a broadcast receiver. However, components included in the communication unit 1013 in the present disclosure are not limited to those described above.

The short-range wireless communicator may include a bluetooth communication module, a bluetooth low energy (BLE) communication module, a near field communication module, a radio frequency identification (RFID) module, a wireless local area network (WLAN, Wi-Fi) communication module, a Zigbee communication module, an Ant+ communication module, a wireless fidelity (Wi-Fi) direct (WFD) communication module, or an ultra-wideband (UWB) communication module.

However, communication modules included in the short-range wireless communicator in the present disclosure are not limited to those described above. For example, the short-range wireless communicator may include an infrared data association ((IrDA) communication module. The short-range wireless communicator may use low-power Bluetooth communication when receiving a beacon signal.

The mobile communicator transmits and receives wireless signals to and from at least one of a base station, an external terminal, and/or a server on a mobile communication network. Here, the wireless signal may be a voice call signal, a video call signal, or data in any one of various formats according to transmission and reception of a text/multimedia message.

The broadcast receiver receives a broadcast signal and/or information about a broadcast via a broadcast channel from the outside. The broadcast channel may include at least one of a satellite channel, a terrestrial channel, and a radio channel, but is not limited thereto.

The audio reproduction control device 1010 may include, but is not limited to, a mobile terminal or portable terminal such as a smart phone, a personal digital assistant (PDA), a wearable device, or a device based on Internet of Things (IoT).

When the audio reproduction control device 1010 is a smartphone, the audio reproduction control device 1010 may operate by executing an application capable of performing a method according to the present disclosure. The above-described application may provide a graphical user interface (GUI) composed of the wheel region 201 and the touch region 202 shown in FIG. 2.

The storage device 1040 may store an audio signal that can be provided from the audio providing device 1030. The storage device 1040 may store information stored in the memory 120. For example, the storage device 1040 may store mapping information as shown in FIG. 3. The storage device 1040 may include, but is not limited to, a mobile terminal such as a smart phone, a smart television, a desktop personal computer (PC), a PDA, a wearable device, or a device based on IoT.

The audio providing device 1030 may be, but is not limited to, a server that provides audio. The audio providing device 1030 may include, but is not limited to, a mobile terminal such as a smart phone, a smart television, a desktop PC, a PDA, a wearable device, or a device based on IoT.

The user interface 1011 may be configured and operative similar to the user interface 110 shown in FIG. 1. The processor 1012 may be configured and operative similar to the processor 150 shown in FIG. 1.

The processor 1012 may update a program that can execute the method of controlling the operation of the audio reproduction device 100 stored in the storage device 1040. The processor 150 shown in FIG. 1 may also update a program that can execute the method of controlling the operation of the audio reproduction device 100 stored in the memory 120.

The processor 1012 may control the operation of the audio reproduction control device 1010 based on the flowchart shown in FIG. 11 described later below. The processor 150 may control the operation of the audio reproduction device 100 based on the flowchart shown in FIG. 11 described later below.

The speaker and lighting device 1020 may perform operations similar to the speaker 130 and the lighting unit 140 of FIG. 1.

Figure 11:
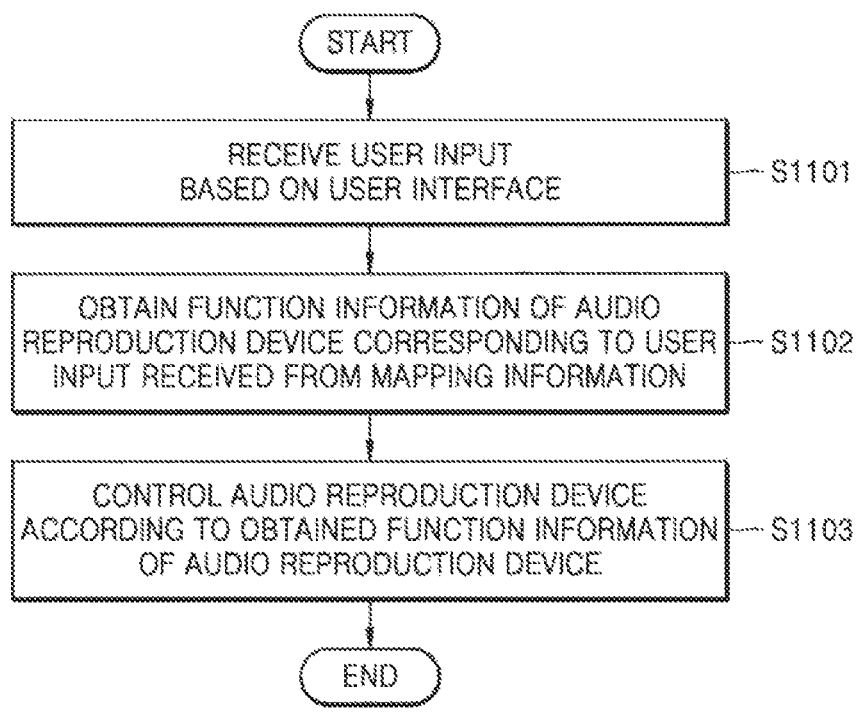
FIG. 11 is a flowchart of an operation control method executed in an audio reproduction device according to an embodiment.

FIG. 11 is a flowchart of an operation control method executed in the audio reproduction device 100 according to an embodiment. The above-described method may be implemented by a computer program. For example, the above-described method may be performed by an application installed in the audio reproduction device 100. The above-described computer program may be operated in an operating system environment installed in the audio reproduction device 100. The audio reproduction device 100 may use the computer program by writing and reading the computer program to/from a storage medium.

Referring to FIG. 11, in operation S1101, the audio reproduction device 100 receives a user input based on the user interface 110. The received user input may include the user input based on the user interface 110 of FIG. 1.

In operation S1102, the audio reproduction device 100 obtains function information of the audio reproduction device 100 corresponding to a user input received from mapping information stored in the memory 120. The audio reproduction device 100 may obtain the function information of the audio reproduction device 100 corresponding to the received user input as described with reference to FIG. 1.

In operation S1103, the audio reproduction device 100 controls an operation of the audio reproduction device 100 according to the obtained function information of the audio reproduction device 100. The audio reproduction device 100 may control the operation of the audio reproduction device 100 according to the received user input as shown in FIGS. 3 and 5 to 9.

The embodiments of the present disclosure may be written as computer programs and may be implemented in general-use digital computers that execute the programs using a computer readable recording medium. A non-transitory computer readable medium may be any usable medium that may be accessed by a computer, and may include any usable medium, such as, a volatile and non-volatile medium and a discrete type and non-discrete type medium. Also, the non-transitory computer readable medium may include all computer storing media and communication media. The computer storing medium may include any medium, such as, a volatile and non-volatile medium and a discrete type and non-discrete type medium that is realized by a method or technique for storing information, such as, a computer readable command, a data structure, a program module, or other data. The communication medium may include other data of modulated signal, such as, a computer readable command, a data structure, a program module, or a carrier signal, or other transmission mechanism, and an arbitrary information medium.

The embodiments are examples, and thus, it will be understood by those of ordinary skill in the art that various changes in form and details may be made therein without departing from the spirit and scope of the present disclosure. Therefore, the embodiments should be considered in descriptive sense only and not for purposes of limitation. For example, each constituent element that is described as a singular form may be embodied in distribution forms. Also, constituent elements that are described in distribution forms may be embodied in a combined form.

Therefore, the scopes of the embodiments are defined not by the detailed description but by the appended claims, and all differences within the scope will be construed as being included in the embodiments.

The invention claimed is:

1. An audio reproduction device comprising:
   a user interface comprising at least one wheel device which is rotatable clockwise or counterclockwise according to a clockwise or counterclockwise rotation input to rotate the at least one wheel device clockwise or counterclockwise;
   a lighting unit comprising a plurality of lights;
   a speaker; and
   a processor, wherein the processor is configured to:
      obtain an audio signal which is received through a wireless communication interface from an external device,
      receive the clockwise or counterclockwise rotation input that is performed through the user interface rotating the at least one wheel device clockwise or counterclockwise,
      process the audio signal by adding a disc jockey (DJ) effect such that the DJ effect is applied in association with the audio signal for sound presentation and control the lighting unit to adjust at least one of color or brightness of light emitted from at least one of the plurality of lights of the lighting unit based on the clockwise or counterclockwise rotation input being a first clockwise or counterclockwise rotation input received through the at least one wheel device,
      control the speaker to output the processed audio signal, and
      control the lighting unit to select a lighting effect category from lighting effect categories which are applied to a light emitted from at least one of the plurality of lights of the lighting unit based on the clockwise or counterclockwise rotation input being a second clockwise or counterclockwise rotation input received through the at least one wheel device.

2. The audio reproduction device of claim 1, wherein the processor controls the speaker to output the processed audio signal or controls the lighting unit based on function information comprising at least one of DJ effect setting information or lighting effect setting information.

3. The audio reproduction device of claim 1, wherein the plurality of lights of the lighting unit comprise:
- a first light configured to fill a unit surface of the speaker; and
- a second light arranged on a contour portion of the unit surface of the speaker.

4. The audio reproduction device of claim 1, wherein the user interface further comprises at least one touch region inside the at least one wheel device and configured to receive an input independent of the clockwise or counterclockwise rotation input enabled through the at least one wheel device.

5. The audio reproduction device of claim 1, wherein the processor is further configured to control the lighting unit so that the light emitted from at least one of the plurality of lights is based on the DJ effect providing the sound presentation with respect to the audio signal.

6. The audio reproduction device of claim 1, wherein the processor is further configured to change a lighting effect category based on a user input received through the at least one wheel device.

7. The audio reproduction device of claim 1, wherein the processor is further configured to select a folder based on a user input received through the at least one wheel device.

8. The audio reproduction device of claim 1, wherein the processor is further configured to select a music file based on a user input received through the at least one wheel device.

9. The audio reproduction device of claim 8, wherein the processor is further configured to receive the user input which is pressing of a button corresponding to a search mode to search for a folder of the music file.

10. The audio reproduction device of claim 1, further comprising:
- a memory storing information of an operation mode,
- wherein the processor processes the audio signal in association with the DJ effect or controls the lighting unit based on the information of the operation mode stored in the memory.

11. The audio reproduction device of claim 1, wherein the processor processes the audio signal in association with the DJ effect independently from controlling of the lighting unit to adjust the at least one of color or brightness of light emitted from the at least one of the plurality of lights of the lighting unit.

12. The audio reproduction device of claim 1, wherein the DJ effect comprises a scratch sound.

13. A method of controlling an operation of an audio reproduction device including at least one wheel device, a lighting unit comprising a plurality of lights, and a speaker, the method comprising:
- obtaining an audio signal which is received through a wireless communication interface from an external device;
- receiving a clockwise or counterclockwise rotation input to rotate the at least one wheel device clockwise or counterclockwise, the at least one wheel device being rotatable clockwise or counterclockwise according to the clockwise or counterclockwise rotation input that is performed through a user interface rotating the at least one wheel device;
- processing the audio signal by adding a disc jockey (DJ) effect such that the DJ effect is applied in association with the audio signal for sound presentation and controlling the lighting unit to adjust at least one of color or brightness of light emitted from at least one of the plurality of lights of the lighting unit based on the clockwise or counterclockwise rotation input being a first clockwise or counterclockwise rotation input received through the at least one wheel device;
- controlling the speaker to output the processed audio signal, and
- controlling the lighting unit to select a lighting effect category from lighting effect categories which are applied to a light emitted from at least one of the plurality of lights of the lighting unit based on the clockwise or counterclockwise rotation input being a second clockwise or counterclockwise rotation input received through the at least one wheel device.

14. The method of claim 13, wherein the audio signal or the lighting unit is controlled based on function information comprising at least one of DJ effect setting information or lighting effect setting information.

15. The method of claim 13, further comprising:
- controlling the lighting unit so that the light emitted from the at least one of the plurality of lights is based on the DJ effect providing the sound presentation with respect to the audio signal.

16. The method of claim 13, wherein the at least one wheel device comprises at least one touch region inside the at least one wheel device and configured to receive an input independent of the clockwise or counterclockwise rotation input enabled through the at least one wheel device.

17. The method of claim 13, wherein the audio reproduction device further comprises:
- a memory storing information of an operation mode,
- wherein the audio signal is processed in association with the DJ effect or the lighting unit is controlled based on the information of the operation mode stored in the memory.

18. The method of claim 13, wherein the audio signal is processed in association with the DJ effect independently from the controlling of the lighting unit to adjust the at least one of color or brightness of light emitted from the at least one of the plurality of lights of the lighting unit.

19. The method of claim 13, wherein the DJ effect comprises a scratch sound.

20. A non-transitory computer-readable recording medium having recorded thereon a program which, when executed by a computer, performs the method of claim 13.

* * * * *